Aug. 14, 1962 J. L. QUEEN 3,049,704

AMPLITUDE SENSITIVE TRANSPONDER

Filed Oct. 31, 1958 2 Sheets-Sheet 1

James L. Queen
INVENTOR.

BY Joel B. Johnson

AGENT

AMPLITUDE SENSITIVE TRANSPONDER

Filed Oct. 31, 1958 2 Sheets-Sheet 2

James L. Queen
INVENTOR.

BY [signature]

AGENT

United States Patent Office 3,049,704

Patented Aug. 14, 1962

3,049,704
AMPLITUDE SENSITIVE TRANSPONDER

James L. Queen, Bethesda, Md., assignor to ACF Industries, Incorporated, New York, N.Y., a corporation of New Jersey Filed Oct. 31, 1958, Ser. No. 770,957
8 Claims. (Cl. 343—6)

Figure 1:
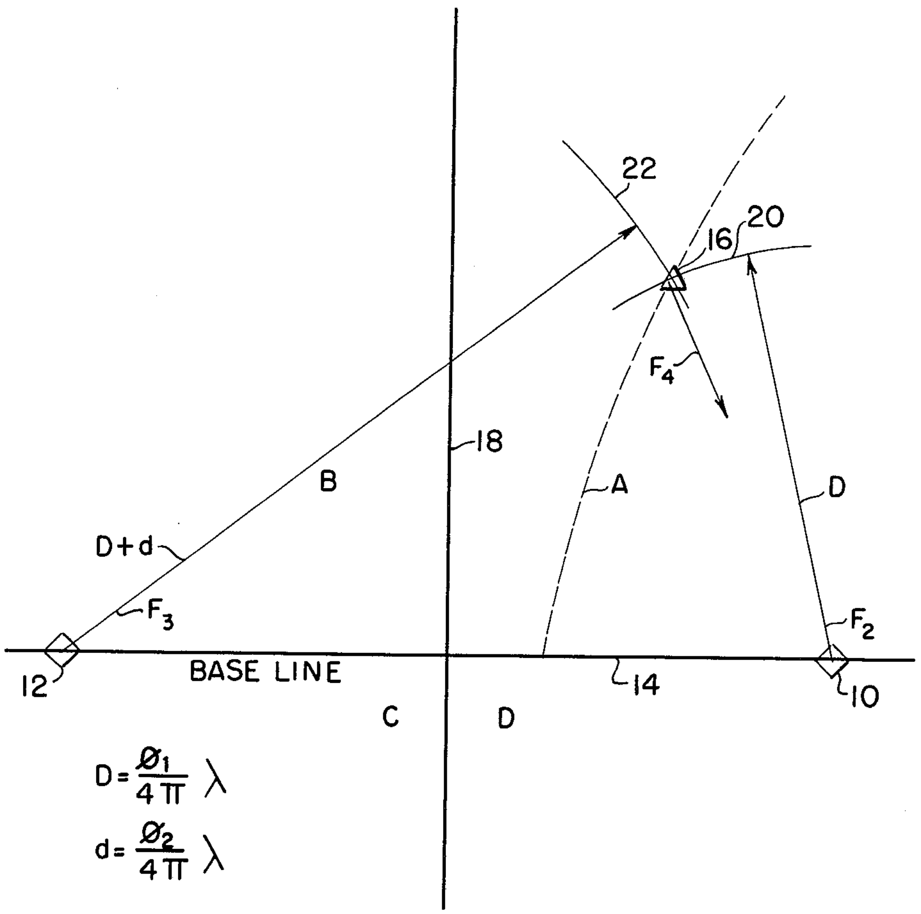

The invention is directed to the system for locating and interrogating a remotely located radio transponder.

Radio location systems have numerous fields of application, being particularly suitable for conditions prohibitive of optical viewing or sonic detection. Various systems have been proposed for surveillance of aircraft in flight and during landing approaches, for ships at sea, for weather observation, and for mobile observation outposts on a battlefield. One general class of radio locating systems is that in which location of a field station is determined by measurements providing loci of two curves, whose intersection represents the position of the field station to be located.

A difficulty with location systems of this type appears when numerous remote receiver-transmitters are to be located by a single set of base stations. For should two units respond to the same conditions established by the base stations, their responses to the control station will occur almost simultaneously, arriving separated by a delay equal to only two times the difference between the propagation times between the units and the central station. The substantial radio bandwidth required to transmit so short a pulse would in many cases be prohibitively extravagant of available radio communications spectrum. Clearly it is necessary to program the reply of remote stations by some restriction on response so as to assure adequate time-wise spacing of successive transmissions and thus allow longer signal pulses.

It is, therefore, an object of the invention to provide an improved system of radio location and communication between a base station and a remotely located field station.

It is another object of the invention to provide an improved system of radio communication between a base station and a plurality of field stations closely positioned in a remote area.

It is a further object of the invention to provide a novel system for separately interrogating one of a plurality of remotely located field stations.

It is a further object of the invention to provide a novel system for automatically programming the time of transmission of information from each of a number of remotely located field stations to a central base station.

It is another object of the invention to automatically condition the response of a remotely located station to interrogation by a central station.

The invention consists of a use of two transmitting base stations one a central station and one a slave station, which are separated by a known distance and which transmit on different carrier frequencies. The carrier wave from each base station is modulated with the same signal, however, the phase relationship of the modulated signal from the central base station is shifted with respect to the modulated signal of the slave base station. Remotely located field stations are distributed in an area lying roughly to one side of the base line joining the two base stations. To determine the accurate location of a field station, each field station includes receivers tuned to the two carrier frequencies of the base stations. When the modulated signals from the base stations are received in phase, the field station transmits a signal to the central base station on a third carrier frequency having the same modulation characteristics of the base stations. The time lag or phase shift of the signal from the field station determines the distance between the central base station and the field station. Since the response of the field station is at a known phase shift between the two base stations, the distance from the slave base station and the field station can be determined. Accurate location of the field station is at the intersection of arcs having as radii, respectively the known distances of the field stations from the two base stations. The location of the units may also be determined by well-known direction finding techniques.

All the field stations are designed to respond to a received signal from the central base station of known amplitude. In general, as the strength of the signal is gradually increased from a minimum to a maximum value, from the central station the field stations closer to the central base station will respond first. This arrangement enables the separation of those stations, which would all respond to the same phase difference between the signals of the two base stations. In this manner, then, instead of having the several stations responding simultaneously, each one can be interrogated separately by the central base station.

FIG. 1 schematically illustrates the operation of the novel interrogating system, in accordance with the invention.

Figure 2:
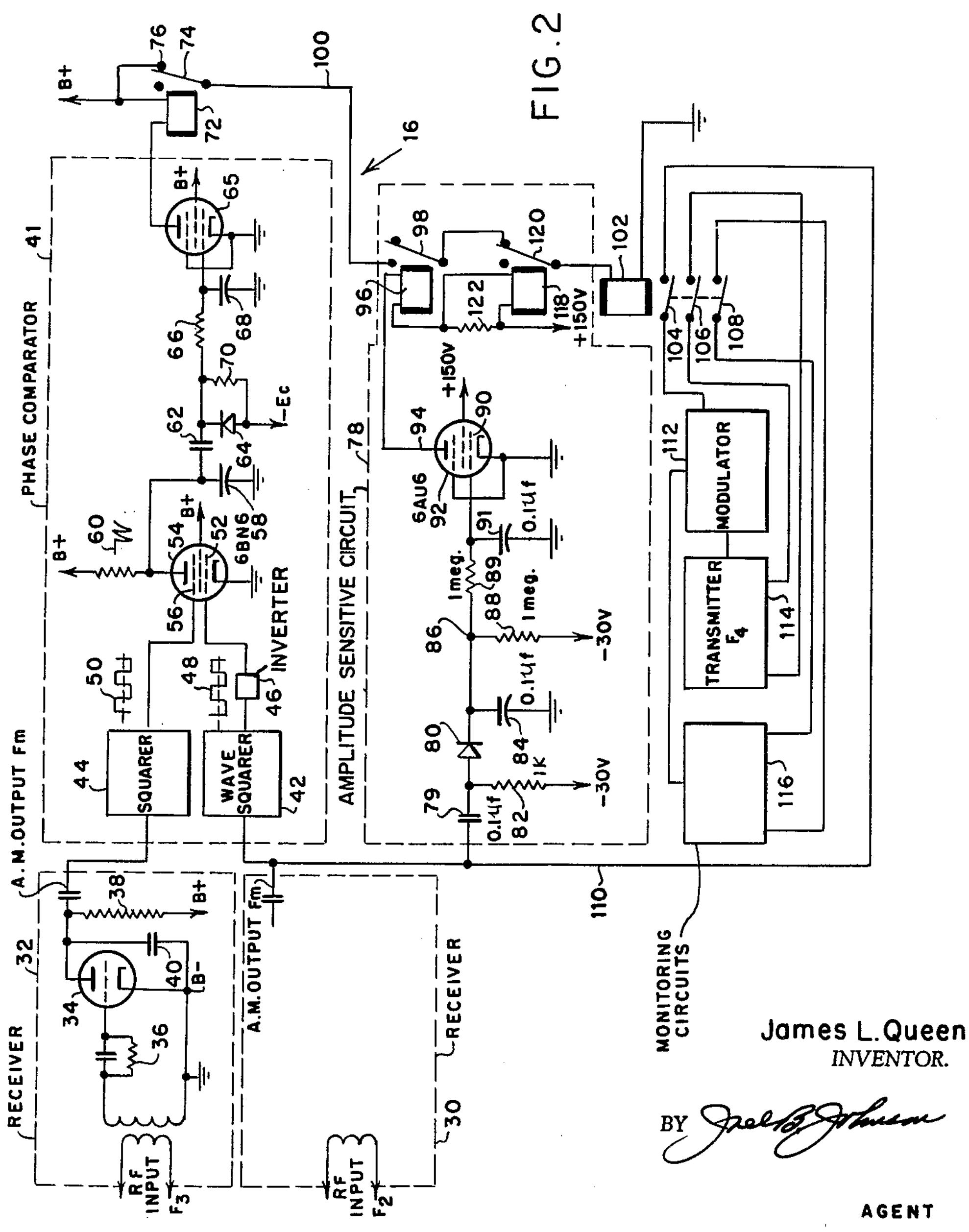

FIG. 2 is a block diagram, showing in detail, portions of the receiving and transmitting system of each field station, in accordance with the invention.

The proposed use of the invention is in the location of identical portable field stations, which have been distributed in a predetermined area but whose exact location is unknown. Upon location of each field station, it is necessary to interrogate the field station to determine its location, as well as to enable it to provide stored information.

FIG. 1 schematically discloses a system in accordance with the invention for locating a field station. A central base station is indicated at 10 and may consist of a radio transmitter and receiver. A second or slave base station 12 is located at known distance from the central base station 10 and along a projected base line 14, extending between the two base stations 10 and 12. The slave station 12 may consist only of a transmitter but may also include a receiver. The two base stations 10 and 12 are designed to transmit a radio signal on different carrier frequencies $F_2$ and $F_3$, respectively. An additional communication channel may be provided between the central station 10 and the slave station 12 to allow the desired degree of control of the operation of slave station 12 from the central base station 10. Such a communication channel might be a two way radio to allow complete setup, calibration, and operation of station 12 from the central base station 10. Another means of communication may consist of a one-way channel from the central station 10 to the slave station 12, in which case the carrier frequency $F_3$, transmitted by the slave station 12, could be used to return setup, calibration and operation data under control of the one-way channel. Also merely a control land line may be used to turn on the transmitter of the slave station 12.

The transmitters of the two base stations 10 and 12 are provided with modulators which produce repetitive pulses at a frequency $F_m$ for modulating the carrier frequencies of the two base stations. The modulating signals $F_m$ at both base stations have identical characteristics and may be pulses or sine waves. A typical modulating frequency may be 5,000 cycles having a weve length of approximately 37 miles. The system of FIG. 1 is that which operates within a field of search which extends from the base station 10, a distance less than a half wave length of the modulating signal. If the direction from which the response comes is measured, rather than, or in addition to the time delay, the distance does not have to be restricted to less than a half wave length.

The purpose of the system, in accordance with the invention, is to locate portable field transponder units in a given area substantially determined by the distance between the base stations 10 and 12. Such units may be those which have been dropped by aircraft crossing inaccessible territory extending on one side of the base line 14. It is desirable to locate accurately such field units to interrogate them, so that stored information can be received at the central base station 10. FIG. 1 discloses a transponder field station 16, whose location is unknown. Field station 16 includes a pair of receivers with one of the receivers tuned to the carrier frequency $F_3$ of the slave station 12 and the second receiver tuned to the carrier frequency $F_2$ from the central base station 10. The modulation signal $F_m$ applied to the carrier frequency $F_3$ of the slave station 12 is kept constant, while means are provided at the central base station 10 to enable an operator to change the phase relationship of the modulating signal $F_m$ applied to the carrier frequency $F_2$ of the central base station 10 to the modulating signal $F_m$ applied to the carrier frequency $F_3$ transmitted by the slave station 12.

When the two modulating signals $F_m$ simultaneously applied respectively to the carrier frequencies $F_2$ and $F_3$ are maintained in phase, the transmitted signals from the two base stations will arrive in phase only at those points forming the perpendicular bisector 18 of the base line 14 extending between the base stations 10 and 12. The perpendicular bisector 18 and the base line 14 divide the search area between base stations 10 and 12 into four quadrants. Because of knowledge of the general location of the field stations, two of the quadrants C and D may be eliminated.

If the phase relationship between the modulating signals simultaneously applied to the carriers of base stations 10 and 12 is changed from an in-phase relationship to an out of phase relationship, then there will be points within either quadrant A or B, at which the two signals from base stations 10 and 12 will be in phase. The in-phase points in either quadrant A or B will all lie along a line forming a portion of a hyperbola having a focus at one of the two stations 10 or 12. If the modulation $F_m$ of the signal $F_2$ put out by the central base station 10 is delay in phase relative to the modulation $F_m$ of signal $F_3$ put out by station 12, then the points of in-phase reception will be on a hyperbolic line in quadrant A. On the other hand, if the modulation $F_m$ of the signal $F_2$ of station 10 is advanced relative to that of the signal $F_3$ of station 12, the points at which the two signals $F_2$ and $F_3$ are received in phase will fall on a hyperbolic line in quadrant B.

The modulation $F_m$ applied to the signal $F_2$ of the central station 10 is varied in order to either advance or retard its phase relationship relative to the modulation $F_m$ of the signal of station 12. No specific device for shifting the phase relationships of the two signals is disclosed in this application, since devices and techniques are well known. In this manner, then, quadrants A and B may be selectively searched or scanned by either retarding or advancing the modulation of signal $F_2$ relative to that of signal $F_3$.

A field station 16 in quadrant A, for example, is designed to respond to the received signals $F_2$ and $F_3$ when the common modulation of these two signals are received in phase by station 16. The field station 16, to be described in detail below, will upon the reception of the in-phase signals $F_2$ and $F_3$ immediately transmit a return signal $F_3$ having the same modulation signal $F_m$. Because of the distance between field station 16 and the central base station 10, the modulated signal $F_4$ received by station 10 will be out of phase with the transmitted signal $F_2$. The phase angle difference between signals $F_2$ and $F_4$ can be easily determined by conventional methods to calculate the distance between station 10 and field station 16. This distance D is that fraction of the wave length of the modulating signal $F_m$ determined by the ratio of the phase angle $\phi_1$ to 4Π, the equation being as follows:

$$D=\frac{\phi_1}{4\Pi}\lambda$$

in which λ is the wave length of the modulating signal $F_m$. With the distance from the central base station 10 to the field station 16 known, then, the distance from the other base station 12 to the field station 16 is known since this distance is equal to the distance D plus another distance *d*, in which the distance *d* is determined by the phase difference of the modulating signals $F_m$ applied to the transmitting signals $F_2$ and $F_3$. The distance *d* is determined in the same manner as the distance D and is equal to that fraction of the wave length λ of the modulating signal determined by the ratio of the phase angle difference $\phi_2$ between the modulating signals of the two carrier signals $F_2$ and $F_3$ to 4Π. This distance *d* is determined by the following equation:

$$d=\frac{\phi_2}{4\Pi}\lambda$$

Once the distance D and *d* are thus determined, the location of field station 16 may be located by striking an arc 20 from station 10 having a radius proportional to D and striking a second arc from station 12 and with a radius proportional to $D+d$.

In a system in which a number of field units are to be located and interrogated by a single central station, a practical difficulty arises, if two or more field units happen to lie relatively close together on the same hyperbola. In such a case, more than one unit will reply within a very short interval; the replies being separated in time by only twice the difference in propagation time from the central station to the respective field units. If, for example, the field units were to be separated by a distance of 500 ft., reply pulses would be separated by only about one microsecond. The use of a pulse modulation as short as the one microsecond required to separate such short replies would have serious disadvantages. Primary of such is the fact that a large bandwith, of approximately two megacycles, would be required to accommodate the side bands characteristic of so short a pulse. The difficulty of superimposing sufficient other information on so short a pulse would be a secondary disadvantage.

In accordance with the invention, it is proposed to remedy this difficulty by the use of an amplitude discriminating switching circuit so that each field station 16 is designed to be sensitive to the amplitude of received signals, as well as to compare the phase relationship between the received signals $F_2$ and $F_3$ from the base stations 10 and 12. FIG. 2 discloses a radio receiver-transmitter device, which comprises each field unit and which is, in essence, a repeated station for modulation $F_m$ contained on carrier $F_2$ from field station 10, but with additional information from the field station superimposed on the transmitted signal $F_4$.

A block 30 represents a first receiver, which is tuned to receive a signal on the RF carrier frequency $F_2$, while the block 32 represents a second receiver tuned to the RF carrier frequency $F_3$. Each receiver 30 and 32 may be of any known design and for purposes of illustration may consist of a circuit schematically shown in FIG. 2. Each of the receivers 30 and 32 comprises principally a grid-leak circuit detector having a triode 34, which provides a rectifying action between the cathode and grid of the tube. The RF input is coupled to the cathode-grid circuit to provide a rectified D.C. voltage which flows through the grid leak 36. This biases the grid of tube 34 negatively with respect to the cathode and the modulation frequency variations in voltage across resistor 36 are amplified by the tube 34. Resistor 38 in the plate circuit of tube 34 is a plate load resistance and condenser 40 is a by-pass condenser to eliminate the RF in the output circuit. The receivers 30 and 32, thus, each provide an output signal consisting only of the modulating signal $F_m$ applied to the two carrier frequencies of $F_2$ and $F_3$. The output signal is labelled "AM OUTPUT" in FIG. 2, where the signal has been demodulated at that point.

The output from receivers 30 and 32 is fed to a phase comparator circuit 41. Output from receiver 30 is fed to a wave shaping circuit represented by the box 42, while the output from receiver 32 is also fed to a second wave shaping circuit represented by box 44. The two shaping circuits 42 and 44 may be of any well known design used for providing a square wave output. Such square wave generation can be provided by well known multivibrator circuits or by circuits, which alternately clip and amplify the input signal to provide a square wave. The output from the wave shaping circuit 42 is inverted by an inverter circuit 46 to provide a wave form schematically shown at 48.

The output from the wave shaping circuit 44 is represented by the schematically shown square wave 50. The inverted square wave 48 is fed to the first grid 52 of a pentode type tube 54 such as a 6BN6 and the output 50 of the wave shaping circuit 44 is applied directly to the third grid 56 of tube 54. The amplitudes of the two shaped waves 48 and 50 are sufficient to cause saturated current flow in the tube during coincidence of the positive portions of the waves 48 and 50 and complete cut off during the negative portions of either wave. Thus, plate current flows in tube 54 only when both grids 52 and 56 are positive and the current flow is substantially constant during this interval. A condenser 58 connected to the plate circuit provides an integrated signal of the current to produce a voltage at the plate with a peak negative excursion proportional to the interval of conduction of the tube. This voltage has a wave form schematically represented by the curve 60. The voltage is coupled through capacitor 62 to a shunt rectifier 64, which is in turn connected to a negative voltage source $E_c$ and to the first grid of a second pentode tube 65. Resistor 66 and capacitor 68 filter the rectified voltage which is thus impressed upon the first grid of tube 65. Resistor 70 provides a leakage path to restore the voltage of the first grid of tube 65 when the rectified input voltage decreases in amplitude.

The operation of the phase comparator 41 is such that, when the two output signals from receivers 30 and 32, respectively, are not in phase, the output of tube 54 is of large amplitude and a positive voltage is rectified by the circuit of rectifier 64, which causes tube 65 to conduct and operate relay 72 connected into the plate circuit of tube 65. This maintains switch 74 in circuit 100 open. As the output modulation waves from receivers 30 and 32 are brought closer to the in-phase condition, the conducting interval of tube 54 decreases approaching zero for actual in-phase conditions. As the peak voltage output of tube 54 decreases, the voltage of the first grid of tube 65 decreases. At in-phase condition, this action cuts off the plate current of tube 65 to relay 72 which permits switch 74 to close and make contact with terminal 76.

In accordance with the invention and as shown in FIG. 2, the signal output $F_m$ from receiver 30 is also fed into an amplitude sensitive switching circuit 78 through condenser 79. This switching circuit 78 includes a diode rectifier 80 for providing a D.C. voltage from the input signal $F_m$. A resistor 82 connected to a voltage source of a negative 30 volts, as indicated, together with condenser 84, having one plate grounded, tends to smooth out the rectified voltage, so that at point 86 the voltage curve is a small ripple. The values of resistor 88 and condenser 84 are indicated in FIG. 2 and are those chosen to provide a filtering effect in which the maximum voltage decay is approximately 63% in one second. Thus, since the signal $F_m$ fed into this circuit is 5,000 cycles per second, the voltage decay would only be $\frac{1}{5000}$ of this maximum drop. A resistor 89 is connected between point 86 of the circuit and the control grid 90 of a pentode 92, and a capacitor 91 is connected between the control grid 90 and ground to provide a further filtering of the wave form, so that the voltage applied to control grid 90 of pentode 92 is substantially a steady direct current voltage.

The output signal $F_m$ fed by receiver 30 into the switching circuit 78 is directly proportional to the amplitude of the incoming RF signal $F_2$ received by the receiver 30. The amplitude of the signal $F_2$ received by any one of the field stations is a rough measurement of the distance of each station from the main base station 10, as indicated above. To monitor the scattered field stations, the signal $F_2$ is first sent out by station 10 at low strength and the amplitude of the signal is increased slowly. Each field station is triggered by the operation of switching circuit 78, in which the increasing amplitude of the signal $F_m$ fed into the switching circuit drives the control grid 90 of tube 92 in a positive direction to overcome its negative bias and cause the tube 92 to conduct. The values of the components of the switching circuit 78 are selected so that the circuit becomes operative when a signal in the order of 30 volts peak is fed into the circuit from receiver 30. Those field stations closest to the base station 10 will be triggered first. Conduction of tube 92 permits sufficient current flow in the plate circuit 94 of the tube to actuate relay 96 and close the normally open switch 98. Closing of switch 98 completes circuit 100 through switch 74, which is closed in the manner described above and through a switch 120 and a relay winding 102.

Actuation of relay 102 closes ganged switches 104, 106 and 108. Closing of switch 104 connects the output of receiver 30 through conductor 110 to a modulator circuit 112 to superimpose the AM signal $F_m$ on the carrier frequency $F_4$ transmitted by a transmitter 114. Closing of switch 106 turns on transmitter 114, so that it now sends out signal $F_4$. This signal from field station 16 tells the operator at station 10 that a field station has been triggered-on, so that he maintains the amplitude of his transmitted signal $F_2$, until he has received all the desired information from the station 16. This information is that which is fed into the modulator 112 and then to the transmitter 114 by any one of several monitoring circuits indicated by the block 116. The closing of switch 108 activates these monitoring circuits so that they feed information into modulator 112 to be transmitted from station 16.

The monitoring circuits 116 are not disclosed in detail but may be of any well-known type, such as those which are designed to supply information of local ambient conditions such as temperatures, barometric pressure, etc. or such as infra-red or sonic detectors. Such circuits may also be of a type, which provide the counting of vehicles on an adjacent highway. Such a counter may consist of a photocell and its amplifying circuit, in which the photocell is actuated by a beam of light extending across the highway. Information, provided by the monitoring circuits 116, may also include that which has been stored in any appropriate manner such as on a tape recorder previously operated to collect certain audible information and which is now operated by the closing of switch 108 to read back such information electrically to modulator 112.

When the base station 10 has received sufficient information from field station 16, the transmitter of the field station is automatically cut off, by the operator increasing the amplitude of the transmitted signal $F_2$ from base station 10, for the purpose of interrogating more distant field stations. As the incoming signal $F_2$ increases to a greater amplitude, the current flow through the plate circuit 94 of tube 92 becomes sufficiently great as to also operate relay 118, to open switch 120 and cut the circuit 100 to the relay winding 102. A resistance 122 shunted across the relay coil 118 cuts its sensitivity to approximately one half and prevents the operation of relay coil 118 simultaneously with the operation of coil 96 and it is not until with the larger current flow in plate circuit 94, that coil 118 will become operative. A signal increase received by circuit 78 of 0.5 volt peak will be sufficient to cause the operation of relay coil 118. The normally opened switches 104, 106 and 108 are thus released by relay coil 102 and break the operating circuits of modulator 112, transmitter 114 and the monitoring circuits 116. In this manner, then, the field station 16 is diabled automatically so that it ceases to transmit any signal which might give away its position or interfere with the interrogation of other units.

In accordance with the invention, then, the system of FIG. 2 is one in which a field station may be readily located without interference from other field stations and also can be interrogated at a time selected by the interrogating base station. The field station responds only when the phase comparator portion 41 of the system indicates the two signals from the base stations are being received in phase and also only when the amplitude of the triggering signal from the base station is within a narrow range for interrogation. A signal strength of the triggering signal lying outside of this amplitude range is ineffective to interrogate the station. Thus, as the interrogating signal from the base station is gradually increased in amplitude at each phase variation between the base station signals, the various field units will respond separately and roughly in the order of their distance from the main base station. The transmitted signal $F_4$ modulated by the AM signal $F_m$, when received by the station 10 will accurately determine the distance of the field station 16 from the base station 10, and in the manner as described above.

I claim:

1. A transponder system comprising a receiver for receiving a first modulated radio signal, a transmitter for transmitting a second radio signal, a normally open switching circuit connected to said transmitter for rendering said transmitter operative, and a circuit connected between the output of said receiver and said switching circuit and including means responsive to a first predetermined amplitude of said first modulated signal to close said switching circuit and responsive to a second predetermined amplitude of said first modulated signal to open said switching circuit.

2. A transponder system comprising a receiver for receiving a first modulated radio signal, a transmitter for transmitting a second radio signal, a normally open switching circuit connected to said transmitter for rendering said transmitter operative, and a circuit connected between the output of said receiver and said switching circuit and including means responsive to a predetermined amplitude range of said first modulated signal to close said switching circuit at the low volume of said range and to open said switching circuit at the high volume of said range.

3. A transponder system comprising a receiver for receiving a first modulated radio signal, a transmitter for transmitting a second radio signal, a switching circuit connected to said transmitter for rendering said transmitter operative, and a circuit connected between the output of said receiver and said switching circuit and including means responsive to a predetermined amplitude of said first modulated signal to operate said switching circuit, said amplitude responsive means comprising a first relay device responsive to a first amplitude value of said first modulated signal for closing said switching circuit and a second relay device responsive to a second amplitude value of said first modulated signal for opening said switching circuit.

4. A transponder system comprising a receiver for receiving a first modulated radio signal, a transmitter for transmitting a second radio signal, a switching circuit connected to said transmitter for rendering said transmitter operative, and a circuit connected between the output of said receiver and said switching circuit and including means responsive to a predetermined amplitude of said first modulated signal to operate said switching circuit, said amplitude responsive means comprising an amplifier, means feeding said first modulated signal to said amplifier, a first relay device connected to the output of said amplifier and to said switching circuit and responsive to a first amplified value of said first modulated signal to close said circuit, and a second relay device connected to the output of said amplifier and to said switching circuit and responsive to a second amplified value of said first modulated signal to open said circuit.

5. A transponder system comprising two receivers for receiving separate signals respectively whose carriers are modulated by a common signal, a transmitter for transmitting a radio signal, a switching circuit connected to said transmitter for rendering said transmitter operative, a phase comparator circuit connected to the output of said two receivers and including means responsive to a phase relationship between the modulations of said carriers to close said switching circuit, and a circuit connected between the output of one of said receivers and said switching circuit and including means responsive to a predetermined amplitude of said first modulated signal to operate said switching circuit.

6. A transponder system comprising two receivers for receiving separate signals respectively whose carriers are modulated by a common signal, a transmitter for transmitting a radio signal, a switching circuit connected to said transmitter for rendering said transmitter operative, a phase comparator circuit connected to the output of said two receivers and including means responsive to a phase relationship between the modulations of said carriers to close said switching circuit, and a circuit connected between the output of one of said receivers and said switching circuit and including means responsive to a predetermined amplitude of said first modulated signal to operate said switching circuit, said amplitude responsive means comprising a first relay device responsive to a first amplitude value of said first modulated signal for closing said switching circuit and a second relay device responsive to a second amplitude value of said first modulated signal for opening said switching circuit.

7. An interrogator-transponder system comprising an interrogator base station including a first transmitter for broadcasting a first modulated radio signal, a transponder station including a receiver for receiving said modulated radio signal, a second transmitter for transmitting a second radio signal, a switching circuit connected to said second transmitter for rendering said second transmitter operative, and a circuit connected between the output of said receiver and said switching circuit and including means responsive to a predetermined amplitude of said first modulated signal to operate said switching circuit.

8. An interrogator-transponder system comprising an interrogator base station including a first transmitter for broadcasting a first modulated radio signal, a transponder station including a receiver for receiving said modulated radio signal, a second transmitter for transmitting a second radio signal, a switching circuit connected to said second transmitter for rendering said second transmitter operative, a first amplitude responsive means comprising a first relay device responsive to a first amplitude value of said modulated signal for closing said switching circuit and a second relay device responsive to a second amplitude value of said modulated signal for opening said switching circuit.

References Cited in the file of this patent

UNITED STATES PATENTS

| | | |
|---|---|---|
| 2,514,436 | Alvarez | July 11, 1950 |
| 2,668,287 | Alvarez | Feb. 2, 1954 |
| 2,728,852 | Moran | Dec. 27, 1955 |

UNITED STATES PATENT OFFICE
CERTIFICATE OF CORRECTION

Patent No. 3,049,704 August 14, 1962

James L. Queen

It is hereby certified that error appears in the above numbered patent requiring correction and that the said Letters Patent should read as corrected below.

Column 3, line 61, for "delay" read -- delayed --; line 72, for column 4, line 10, for "$F_3$" read -- $F_4$ --; column 7, line 30, for "repeated" read -- repeater --; same column 7, line 75, and "diabled" read -- disabled --; column 8, line 1, for "volume", each occurrence, read -- value --.

Signed and sealed this 4th day of December 1962.

(SEAL)
Attest:

ERNEST W. SWIDER
Attesting Officer

DAVID L. LADD
Commissioner of Patents